United States Patent
Manuel et al.

(10) Patent No.: US 9,834,971 B2
(45) Date of Patent: Dec. 5, 2017

(54) LIFT ASSIST AND DAMPER ARRANGEMENT

(75) Inventors: Mark Manuel, Conway, SC (US); Jon Roever, Parrish, FL (US)

(73) Assignee: AVM Industries, LLC, Marion, SC (US)

( * ) Notice: Subject to any disclaimer, the term of this patent is extended or adjusted under 35 U.S.C. 154(b) by 1807 days.

(21) Appl. No.: 13/046,959

(22) Filed: Mar. 14, 2011

(65) Prior Publication Data
US 2011/0226973 A1  Sep. 22, 2011

Related U.S. Application Data

(63) Continuation-in-part of application No. 13/046,959, filed on Mar. 14, 2011.

(60) Provisional application No. 61/314,714, filed on Mar. 17, 2010, provisional application No. 61/353,364, filed on Jun. 10, 2010.

(51) Int. Cl.
| | |
|---|---|
| *E05F 3/12* | (2006.01) |
| *E05F 3/10* | (2006.01) |
| *F16F 3/04* | (2006.01) |
| *F16F 9/512* | (2006.01) |
| *F16F 9/56* | (2006.01) |
| *F16F 13/00* | (2006.01) |

(52) U.S. Cl.
CPC ............ *E05F 3/108* (2013.01); *E05F 3/12* (2013.01); *F16F 3/04* (2013.01); *F16F 9/5126* (2013.01); *F16F 9/56* (2013.01); *F16F 13/007* (2013.01)

(58) Field of Classification Search
USPC ........ 188/284, 285, 288, 289, 313, 316, 317, 188/322.15, 300, 265; 267/118, 120, 124
See application file for complete search history.

(56) References Cited

U.S. PATENT DOCUMENTS

| | | | | |
|---|---|---|---|---|
| 3,388,883 | A | * | 6/1968 | Axthammer et al. ..... 248/188.2 |
| 5,028,037 | A | * | 7/1991 | Wang .......................... 267/64.13 |
| 5,839,719 | A | | 11/1998 | Hosan et al. |
| 5,887,857 | A | * | 3/1999 | Perrin ......................... 267/64.12 |
| 6,773,002 | B2 | | 8/2004 | Adoline et al. |
| 7,261,286 | B2 | | 8/2007 | McConnell et al. |
| 7,467,787 | B2 | | 12/2008 | Adoline et al. |
| 2004/0222579 | A1 | | 11/2004 | Adoline et al. |
| 2007/0296130 | A1 | | 12/2007 | McConnell et al. |

* cited by examiner

*Primary Examiner* — Robert A Siconolfi
(74) *Attorney, Agent, or Firm* — Miller Canfield

(57) ABSTRACT

A lockable lift assist assembly includes a piston assembly moveable between an extended position and a retracted position. A valve assembly is coupled in movement together with the piston assembly. The valve assembly is configured to selectively alter a flow of a hydraulic fluid through a fluid communication path established within the valve assembly to control movement of the piston assembly.

15 Claims, 8 Drawing Sheets

FIG. 14D

LIFT ASSIST AND DAMPER ARRANGEMENT

CROSS-REFERENCE TO RELATED APPLICATIONS

This disclosure claims priority to U.S. Provisional Application No. 61/314,714, which was filed on 17 Mar. 2010, and to U.S. Provisional Application No. 61/353,364, which was filed on 10 Jun. 2010. Both of these provisional applications are incorporated herein by reference.

BACKGROUND

Lift assists are used to assist movement of one component relative to another component. In one example, the lift assist is used to assist lifting and rotating a vehicle hood relative to the remaining portions of the motor vehicle.

Springs in the lift assist mechanism are sometimes used to counter-balance loads. The springs can cause the vehicle hood to bounce during the lifting and rotating. Some lift assists utilize smaller springs to avoid more severe bouncing. The smaller springs do not counter-balance the load as effectively as larger springs. Some lift assists rely on external dampers. Overcoming the damping forces is sometimes difficult.

SUMMARY

An example lockable lift assist assembly includes a piston assembly moveable between an extended position and a retracted position. A valve assembly is coupled in movement together with the piston assembly. The valve assembly is configured to selectively alter a flow of a hydraulic fluid through a fluid communication path established within the valve assembly to control movement of the piston assembly.

An example method for operating a lockable lift-assist mechanism includes moving a valve assembly together with a piston assembly between a retracted position and an extended position. The method communicates a flow of hydraulic fluid through the valve assembly to damp the moving. The method selectively restricts the flow of hydraulic fluid through the valve assembly to limit the moving.

An example lockable lift assist assembly includes a piston assembly moveable between an extended position and a retracted position, a tube containing a supply of hydraulic fluid, and a valve assembly disposed within the tube. The valve assembly is coupled in movement together with the piston assembly. A release mechanism is operatively linked to the valve assembly. The release mechanism is configured to move a portion of the valve assembly from a first position that restricts the flow of the hydraulic fluid through the valve to a second position that provides a greater flow through the valve.

An example variable resistance lift assist assembly includes a piston assembly moveable between an extended position and a retracted position. A damper tube is slidably received within an outer tube and configured to slidably receive a valve end of the piston assembly. The damper tube is configured to selectively move with the piston assembly as the piston assembly moves between the extended position and the retracted position. The damper tube damps movement of the piston assembly when the damper tube does not move with the piston assembly.

The various features and advantages of the disclosed examples will become apparent to those skilled in the art from the detailed description. The figures that accompany the detailed description can be briefly described as follows.

DETAILED DESCRIPTION

Referring to FIGS. 1-5, an example lift assist mechanism 10 includes a piston assembly 14 received within an outer tube 18. A rod 22 of the piston assembly 14 extends between a first piston end 26 and a second piston end 30. The rod 22 connects to a release mechanism 34 at the first piston end 26. The rod 22 connects to a valve assembly 38 at the second piston end 30. The valve assembly 38 and a portion of the rod 22 are received within an inner tube 42.

Figure 1:
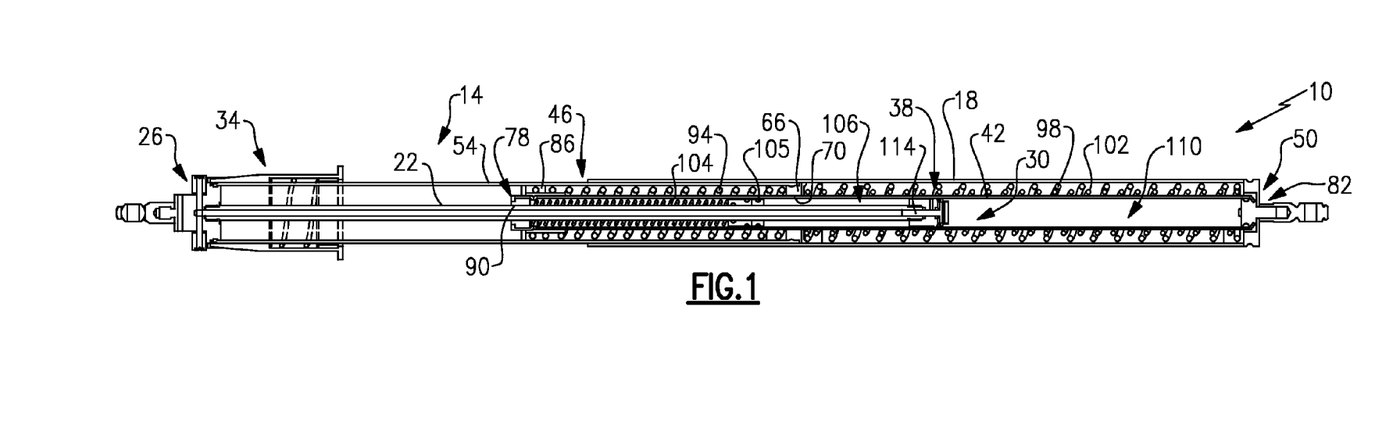
FIG. 1 shows an example locking lift assist mechanism.
Figure 2:
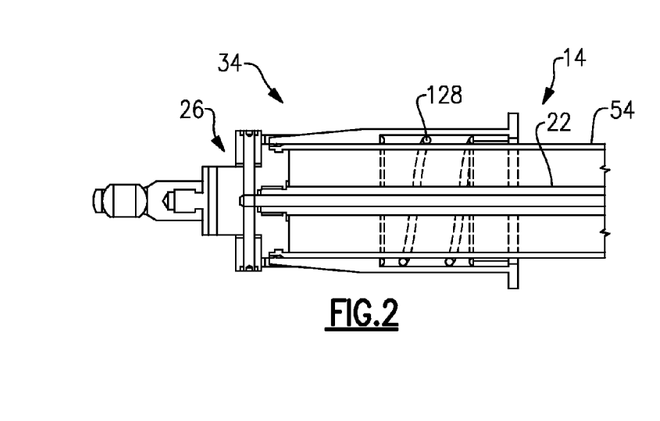
FIG. 2 shows a close-up view of an end of a piston in the FIG. 1 lift assist mechanism.
Figure 3:
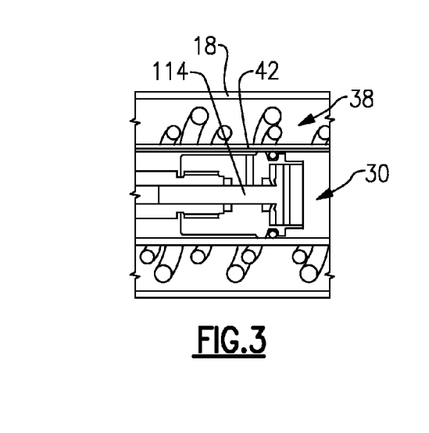
FIG. 3 shows a close-up view of another end of the piston in the FIG. 1 lift assist mechanism.
Figure 4:
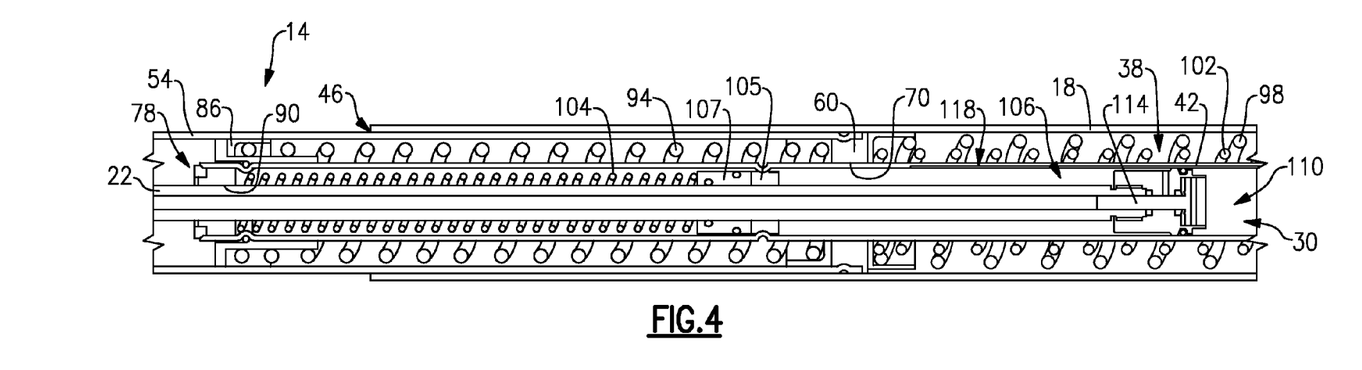
FIG. 4 shows a close-up view of a portion of the FIG. 1 lift assist mechanism.

The outer tube 18 extends between a first outer tube end 46 and a second outer tube end 50. The first outer tube end 46 is open. The piston assembly 14 is slidably received within the first outer tube end 46. The piston assembly 14 is configured to move between extended positions and retracted positions relative to the outer tube 18 and the inner tube 42.

In this example, the first piston end 26 is secured to a vehicle body (not shown), and the second outer tube end 50 of the outer tube 18 is secured to a moveable vehicle component, such as a vehicle hood (not shown). As the movable vehicle component is moved relative to the stationery vehicle component, the piston assembly 14 moves relative to the outer tube 18. A person skilled in the art and having the benefit of this disclosure would understand how to suitably secure the first piston end 26 and the second outer tube end 50.

The piston assembly 14 includes a piston tube 54 that extends from the release mechanism 34 at the first piston end 26 to terminate at a ring 66 housed within the outer tube 18.

The ring 66 establishes an aperture 70 that slidably receives the inner tube 42. The ring 66 slides over the inner tube 42 as the piston assembly 14 moves between extended positions and retracted positions, which stabilizes movements of the piston assembly 14 and the inner tube 42.

The inner tube 42 extends between a first inner tube end 78 and a second inner tube end 82. The second inner tube end 82 is secured adjacent the second outer tube end 50. The first inner tube end 78 extends axially past the first outer tube end 46 and terminates within the piston tube 54 at a stop member assembly 86. The stop member extends radially between the rod 22 and an inner wall of the piston assembly 14.

In this example, the stop member assembly 86 establishes an aperture 90 that slidably receives the rod 22. The rod 22 slides within the aperture 90 relative to the stop member assembly 86 as the piston assembly 14 is extended and retracted. The stop member assembly 86 facilitates maintaining the radial positioning of the rod 22 during movement of the piston assembly 14.

A first spring 94 is housed within the piston assembly 14 and extends between the ring 66 and the stop member assembly 86. The rod 22 and the inner tube 42 are radially inboard the first spring 94 in this example.

The example lift assist mechanism 10 also includes a second spring 98 and a third spring 102 that extend from the ring 66 to the second outer tube end 50 and second inner tube end 82. The inner tube 42 and the rod 22 are radially inboard the second spring 98 and the third spring 102.

The second spring 98 and the third spring 102 are biased to urge the piston assembly 14 toward an extended position. The first spring 94 is biased to urge the piston toward a retracted position. The second spring 98 and the third spring 102 thus provide lift assisting forces to the lift assist mechanism 10.

As can be appreciated, the first spring 94 also damps the force exerted by the second spring 98 and the third spring 102. Similarly, the second spring 98 and the third spring 102 damp the forces exerted by the first spring 94. The first spring 94, the second spring 98, and the third spring 102 thus damp and assist movement of the piston assembly 14 relative to the outer tube 18.

In this example, hydraulic fluid is used to damp movement of the piston assembly 14 relative to the outer tube 18. The hydraulic fluid moves through and around the valve assembly 38 between a cavity 106 and a cavity 110 as the piston assembly 14 moves relative to the outer tube 18. Forcing the valve assembly 38 to move through hydraulic fluid in the inner tube 42 slows movement of the rod 22 and the remaining portions of the piston assembly 14. The hydraulic fluid moves through the valve assembly 38 between the cavity 106 and the cavity 110.

The example lift assist mechanism 10 further includes a fourth spring 104 within the inner tube 42. The fourth spring 104 extends from the stop member assembly 86 to a stop member 105 disposed within the inner tube 42 between the stop member assembly 86 and the valve assembly 38. The fourth spring 104 biases a slider 107 toward the stop member 105. The slider 107 accommodates hydraulic fluid flowing into the cavity 106. The slider 107 essentially adjusts the volume of the cavity 106 to accommodate hydraulic fluid and provides a non-cavitating functionality to the lift assist mechanism 10.

Figure 5:
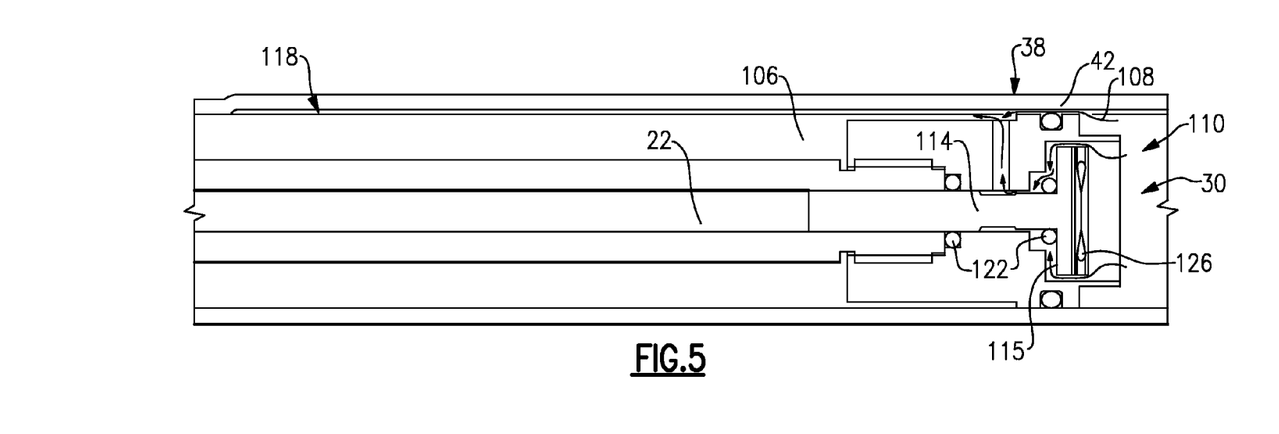
FIG. 5 shows a close-up view of a valve in the FIG. 1 lift assist mechanism.

In this example, a valve pin portion 114 of the rod 22 moves axially relative to the remaining portions of the valve assembly 38 to restrict or permit flow between the cavity 110 and the cavity 106. FIG. 5 shows the general fluid communication path of the hydraulic fluid from the cavity 106 to the cavity 110 when the valve pin portion 114 is in an open position. A surface 115 of the valve pin portion 114 presses against a ring seal 122 to block flow through the valve assembly 38 when the valve pin portion 114 moves away from the open position.

Varying the relative size of the ring seal 122 can adjust the sealing characteristics. In this example, the ring seal 122 is spaced slightly from the valve pin portion 114 or the other portions of the valve assembly 38 to allow flow through the valve assembly 38 when the surface 115 is spaced from the ring seal 122.

In this example, the inner tube 42 establishes a groove 118 that permits a bypass flow of the hydraulic fluid from the cavity 106 to the cavity 110 around the valve assembly 38 at 108. When the valve assembly 38 is axially aligned with the groove 118, the valve assembly 38 is not able to prevent all flow of hydraulic fluid between the cavity 106 and the cavity 110 because, when axially aligned with the groove 118, hydraulic fluid is able to move around the valve assembly 38 through the groove 118 between the cavity 106 and the cavity 110.

When the valve assembly 38 is axially misaligned with the groove 118, the valve assembly 38 is able to block flow of hydraulic fluid between the cavity 106 and the cavity 110. As can be appreciated, blocking flow between the cavity 106 and the cavity 110 locks the position of the piston assembly 14 relative to the outer tube 18.

In this example, the piston assembly 14 is axially misaligned with the groove 118 when the piston assembly 14 is nearly fully extended. Thus, the valve assembly 38 is able to prevent flow between the cavity 106 and the cavity 110 only when the piston assembly 14 is nearly fully extended. Accordingly, the piston assembly 14 can be partially extended and retracted without locking. Other examples include other types of grooves 118 and features enabling locking the piston assembly 14 in other positions.

In this example, the seal rings or pin seals 122 help control flow of fluid through the valve assembly 38. The valve pin portion 114 moves axially relative to the remaining portions of the valve assembly 38 to permit or restrict flow of hydraulic fluid between the cavity 106 and the cavity 110 through the valve assembly 38.

A fifth spring 126 is used to urge the valve pin portion 114 to a restricted flow position. Flow of hydraulic fluid between the cavity 106 and the cavity 110 overcomes the force of the fifth spring 126 and maintains the valve pin portion 114 in an open position. Eventually, the fluid pressure between the cavity 106 and the cavity 110 equalizes, and the fifth spring 126 is able to move the valve pin portion 114 to the closed position.

As the piston assembly 14 is retracted, the valve pin portion 114 can be in a locked position and hydraulic fluid, such as oil, can bypass the valve assembly 38 through the groove 118. Alternatively, as the piston assembly 14 is retracted, the valve pin portion 114 can be held in an unlocked or open position, and the hydraulic fluid moves through the valve assembly 38 and the groove 118. As the piston assembly 118 is extended, the hydraulic fluid is moves through the groove 118 and depresses the fifth spring 126.

In this example, actuating the release mechanism 34 overcomes the biasing force of the fifth spring 126 with the valve pin portion 114 to facilitate flow of hydraulic fluid between the cavity 106 and the cavity 110. For example, the operator can urge the release mechanism 34 axially toward the outer tube 18, which moves the rod 22 forces the valve pin portion 114 to a position that permits flow through the valve assembly 38.

Adjustments to the openings within the valve assembly 38, the groove 118 in the inner tube 42, or both, may take place to modify flow between the cavity 106 and the cavity 110, and the associated damping due to the hydraulic fluid movement. Restricting the flow through the valve assembly 38 increases the damping, for example.

The example release mechanism 34 includes a sixth spring 128 configured to bias the release mechanism 34 toward a position corresponding to the valve assembly 38 in a restricted flow position, which locks the lift assist mechanism 10. The biasing force of the sixth spring 128 accommodates manufacturing variability in the lift assist mechanism 10 and the associated mounting locations. The manufacturing variability is +/−0.5 inches in some examples.

Figures 6, 7, 8:
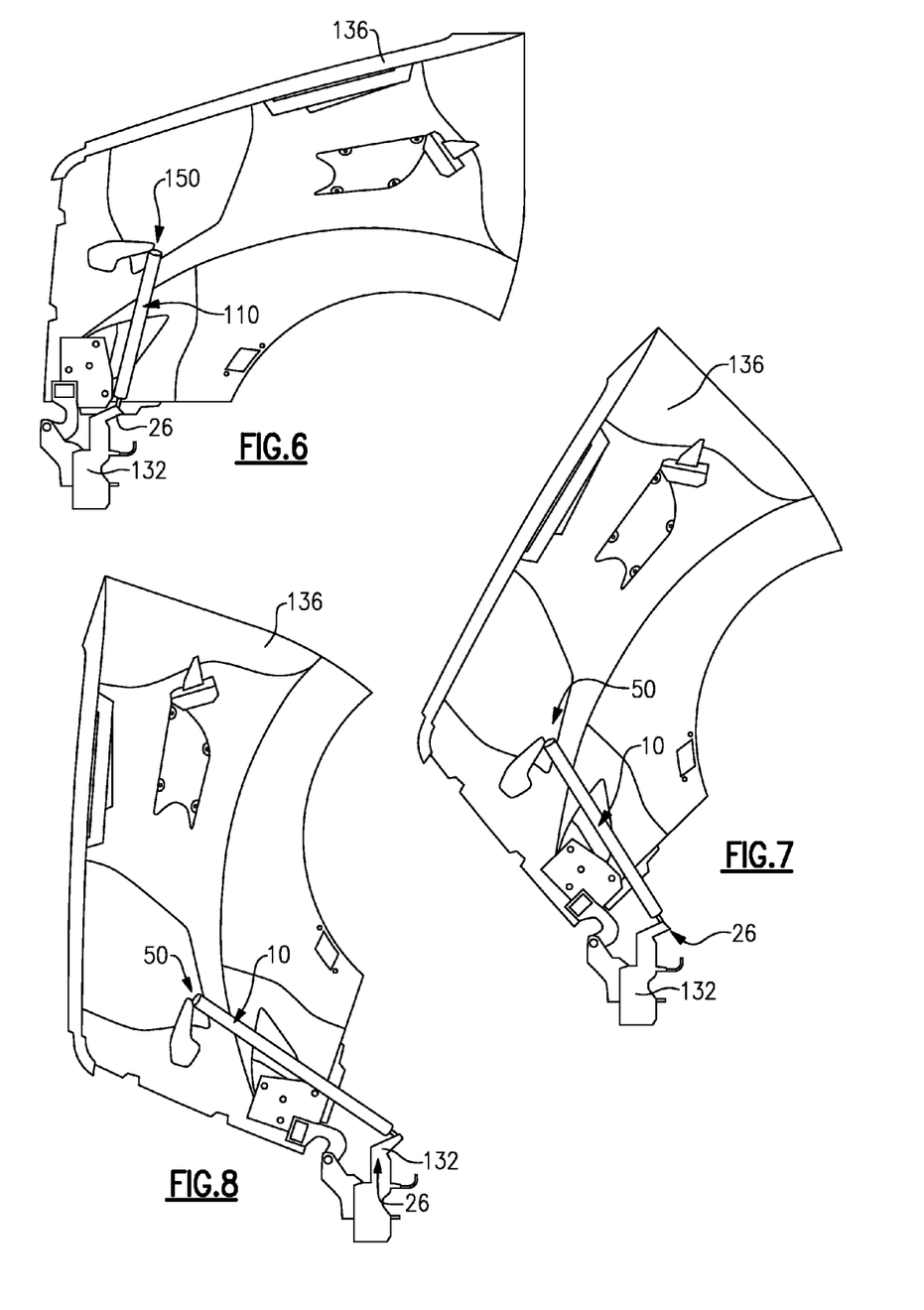
FIG. 6 shows a hood connected to the FIG. 1 lift assist mechanism.
FIG. 7 shows the FIG. 7 hood in a partially open position.
FIG. 8 shows the FIG. 7 hood in fully open position.

Referring to FIGS. 6-8, the first piston end 26 is secured adjacent a vehicle body mounting location 132, and the second outer tube end 50 is secured to a vehicle hood 136. In FIG. 6 the hood 136 is in a closed position and the piston assembly 14 of the lift assist mechanism 10 is retracted relative to the outer tube 18. In this position, the valve assembly 38 is axially aligned with at least a portion of the groove 118.

In this example, the second spring 98 and the third spring 102 provide lift support of the hood 136 from a closed position to a balance point in the rotation of the hood 136. The first spring 94 damps acceleration of the hood 136 as is moves past the balance point and provides lift support to move the hood 136 from a fully open position to the balance point in the rotation of the hood 136.

FIG. 7 shows the hood 136 in a partially open position at the balance point of the hood 136. The valve assembly 38 is partially aligned with the groove 118 in this position.

FIG. 8 shows the hood 136 in a fully opened position. In this position, the piston assembly 14 is fully extended and the valve assembly 38 is axially misaligned with the groove 118. In this position, the valve assembly 38 is able to block flow of hydraulic fluid between the cavity 106 and the cavity 110 to lock the position of the lift assist mechanism 10. The release mechanism 34 is thus only needed when the hood is fully opened.

Figure 9:
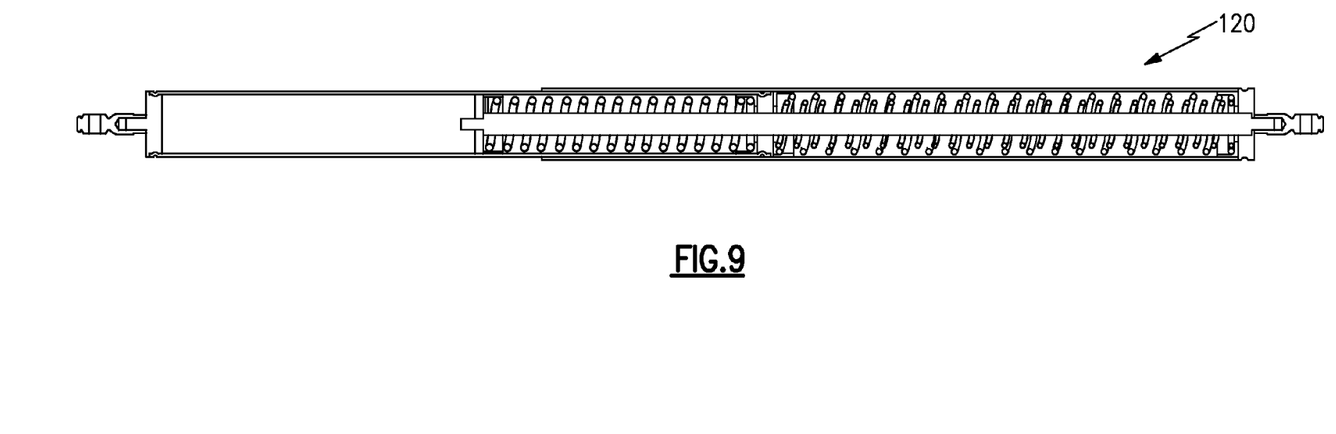
FIG. 9 shows another example lift assist mechanism.

Referring to the example embodiment of FIG. 9, an example lift assist mechanism 120 does not include the release mechanism 34 or the valve assembly 38 (FIG. 1). The lift assist mechanism 140 facilitates damping the hood of FIGS. 7-9, but does not provide locking functionality.

In one example, the lift assist mechanism 140 is mounted to the hood 136 opposite the lift assist mechanism 10. The lift assist mechanism 140 is mounted to the passenger side of a vehicle in this example. The lift assist mechanism 140 assists lifting the hood 136 together with the lift assist mechanism 10.

Referring to FIGS. 10-13, in another example, a valve assembly 38a is mountable adjacent the second piston end 30. The valve assembly 38a utilizes a spring clip 144 to control locking of the valve assembly 38a. Notably, examples using the valve assembly 38a do not require the groove 118 (FIG. 5).

Figure 10:
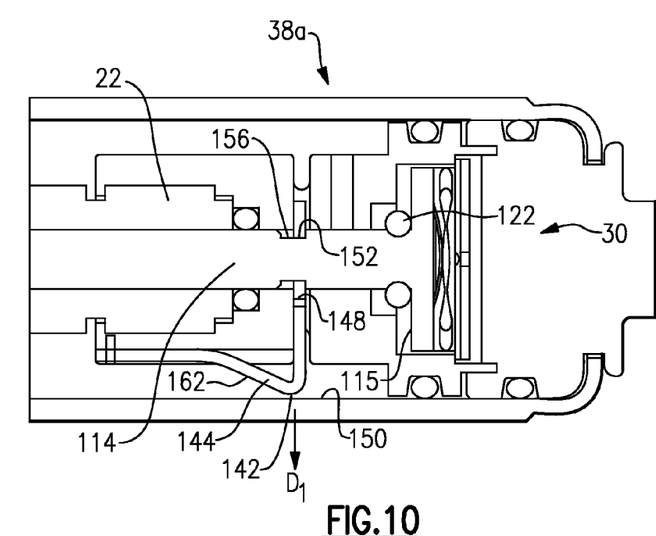
FIG. 10 shows a close-up view of another example valve for use in the FIG. 1 locking lift assist mechanism with the piston in a retracted position.

In this example, the spring clip 144 establishes an aperture 148 that receives the rod 22, and specifically the valve pin portion 114 of the rod 22. The example spring clip 144 is biased in a direction $D_1$ toward a radially outer position relative to the rod 22.

During some of the piston assembly 14 travel relative to the outer tube 18 and inner tube 42, a radially outer portion 142 of the spring clip 144 moves radially near, or even contacts, an inner wall 150 of the outer tube 18. An edge 152 of the spring clip 144 engages a notch 156 established in the valve pin portion 114 of the rod 22 when the radially outer portion 142 of the spring clip 144 contacts the inner wall 150.

The spring clip 144 limits axial movement of the rod 22 when the edge 152 of the spring clip 144 engages the notch 156. As can be appreciated, limiting axial movement of the rod 22 prevents the valve pin portion 114 of the rod 22 (and particularly the surface 115 of the valve pin portion 114) from compressing the ring seal 122, which would block flow through the valve assembly 38a.

Notably, the piston assembly 14 is free to move between extended positions and retracted positions relative to the outer tube 18 and the inner tube 42 when the hydraulic fluid is able to move through the valve assembly 38a. In this example, the hydraulic fluid is able to move through the valve assembly 38a when the valve assembly 38a is in the positions of FIGS. 10, 11, and 13.

In this example, the radially outer portion 142 of the spring clip 144 contacts the inner wall 150 except when the piston assembly 14 is at or near a fully extended position relative to the outer tube 18 and the inner tube 42. Accordingly, the piston assembly 14 is free to move between extended positions and retracted positions relative to the outer tube 18 and the inner tube 42 except when the piston assembly 14 is at or near a fully extended position relative to the outer tube 18 and the inner tube 42. If a user decides to stop extension or retraction of the piston assembly 14 when the spring clip 144 is engaged with the notch 156, the spring clip 144 will keep the valve pin portion 22 open and in an unlocked position allowing hydraulic fluid to flow through the valve assembly 38a.

Figure 11:
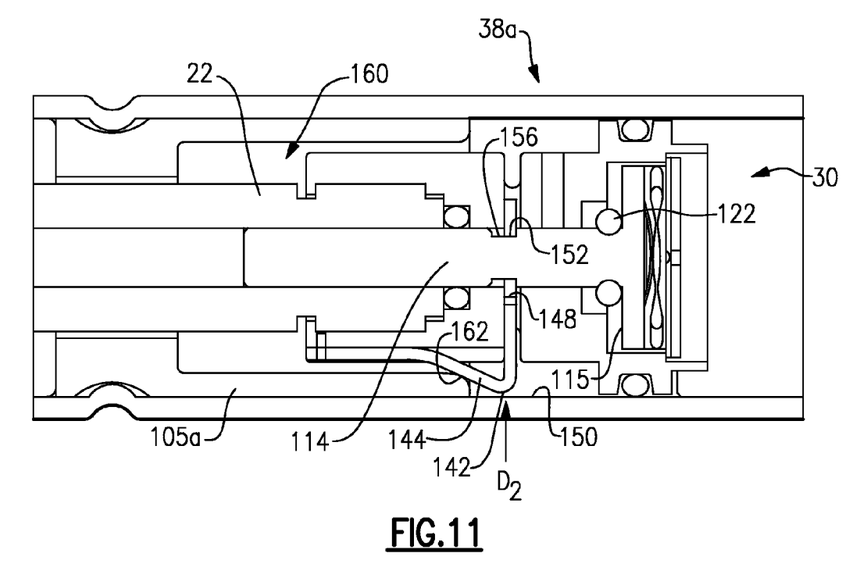
FIG. 11 shows the valve of FIG. 10 with the piston approaching a fully extended position.
Figure 12:
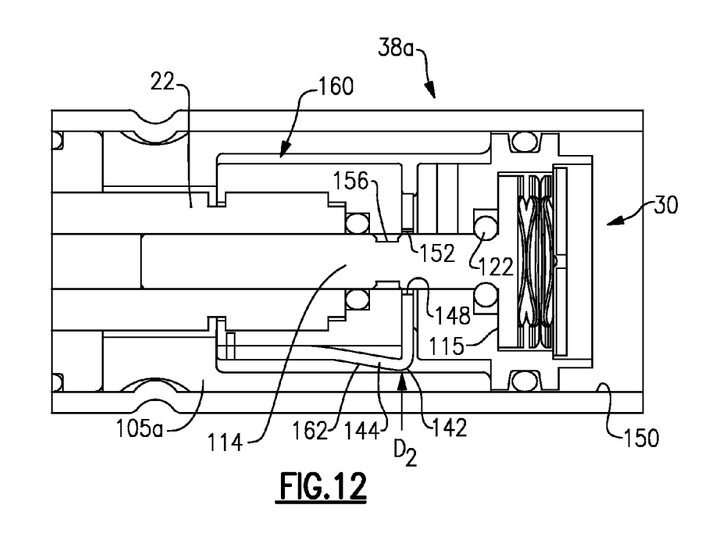
FIG. 12 shows the valve of FIG. 10 with the piston in a fully extended position.

As the piston assembly 14 approaches a fully extended position, a portion of the valve assembly 38a is received within a recessed area 160 of a stop member 105a. The recessed area 160 has a narrower diameter than the outer tube 18. As the portion of the valve assembly 38a moves into the recessed area 160, a ramped area 162 of the spring clip 144 contacts the stop member 105a such that portions of the spring clip 144 are forced radially inward in a direction $D_2$ until the spring clip 144 disengages the notch 156 and the rod 22 is free to move axially relative to the spring clip 144.

In one example, the fifth spring 126, a wave spring, presses the surface 115 of against the o-ring 122 when the spring clip 144 disengages the notch 156, which blocks movement of hydraulic fluid through the valve assembly 38a. The piston assembly 14 is not free to move between extended positions and retracted positions relative to the outer tube 18 and the inner tube 42 when the hydraulic fluid is blocked from moving through the valve assembly 38a. Thus, the position of the piston assembly 14 is locked when the spring clip 144 disengages the notch 156.

Figure 13:
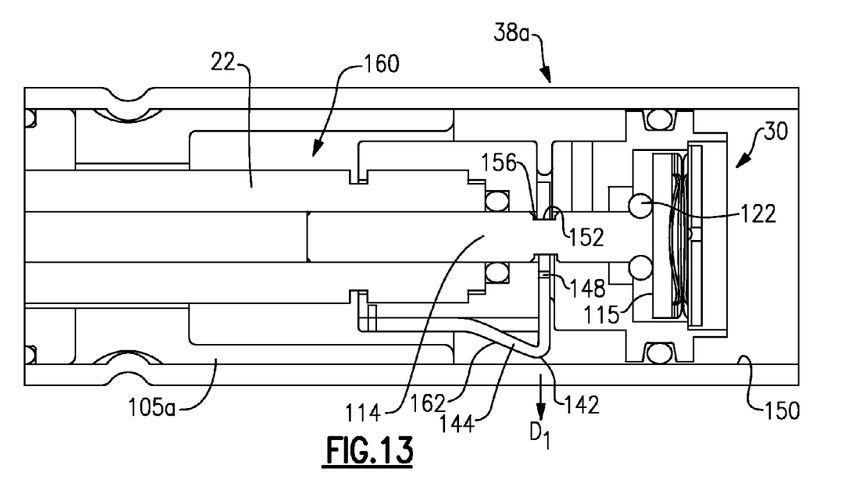
FIG. 13 shows the valve of FIG. 10 with the piston retracting from the fully extended position.

In this example, once the piston assembly 14 is locked, actuating the release mechanism 34 is necessary to overcome the biasing force of the fifth spring 126 to reestablish flow of hydraulic fluid through the valve assembly. In one example, the operator urges the release mechanism 34 axially toward the outer tube 18 to unlock the piston assembly 14. Urging the release mechanism 34 moves the rod 22 and forces the valve pin portion 114 to a position that reestablishes flow through the valve assembly 38. The operator holds the release mechanism 34 until the radially outer edge 142 of the spring clip 144 contacts the inner wall 150 of the outer tube 18. The edge 152 of the spring clip 144 then engages the notch 156 to lock the valve pin portion 114 in a position that allows flow through the valve assembly 38.

Referring to FIGS. 14A-14D, an example damper mechanism 200 includes a damper tube 204 received within an outer tube 208. The damper tube 204 is slideable relative to the outer tube 208 along an axis X. A piston assembly 212 is configured to move between extended positions and retracted positions relative to the outer tube 208.

In this example, the outer tube 208 is attachable to a vehicle body, and the piston assembly 212 is attachable to a vehicle component, such as a vehicle hood. In one example, the damper mechanism 200 is used on the passenger side of the vehicle hood 136 (FIG. 6-8), and the lift assist mechanism 10 is used on the driver side of the vehicle hood 136.

Figure 14A:
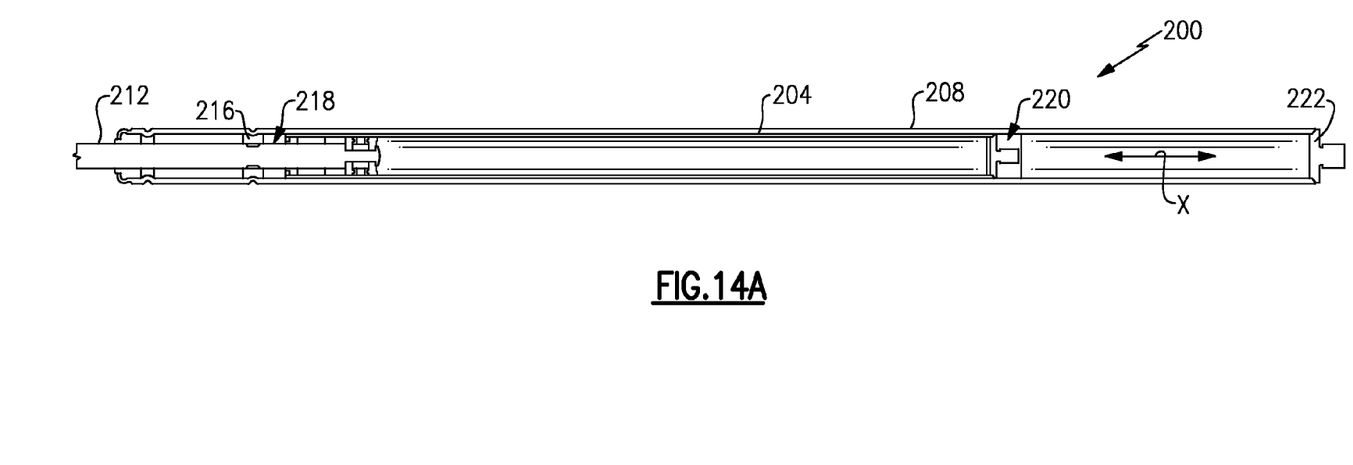
FIG. 14A shows an example damper mechanism in a fully extended position.
Figure 14B:
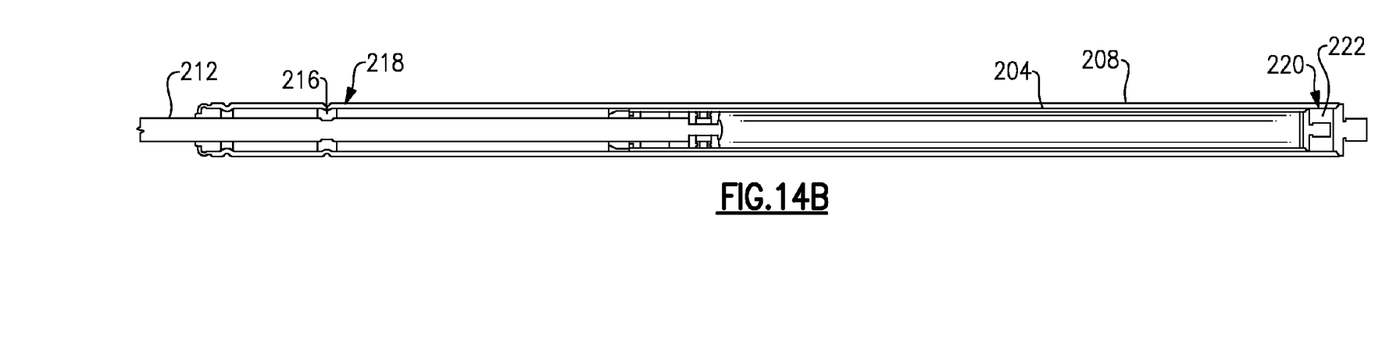
FIG. 14B shows the damper mechanism in a less extended position than the FIG. 14A position.
Figure 14C:
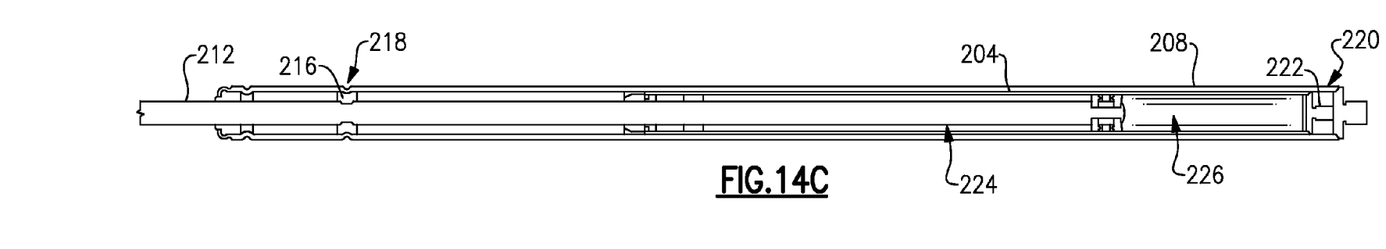
FIG. 14C shows the damper mechanism in a less extended position than the FIG. 14B position.
Figure 14D:
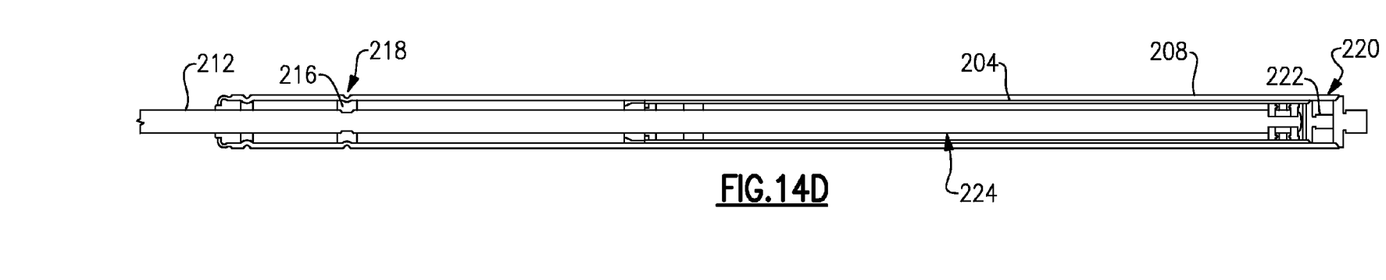
FIG. 14D shows the damper mechanism in a fully retracted position.

The piston assembly 212 moves to an extended position when the component is opened relative to the vehicle body, for example. In the fully extended position, and end 218 the damper tube 204 is positioned against a stop 216. In the fully retracted position, an end 220 of the damper tube 204 the damper tube 204 is positioned against a stop 220.

In this example, the damper tube 204 is full of a fluid, such as a hydraulic oil. As can be appreciated, the fluid damps movement of the piston assembly 212 as the piston assembly 212 moves relative to the damper tube 204. The resistance that the fluid exerts against the piston assembly 212 is greater than the resistance that the damper tube 204 must overcome to move relative to the outer tube 208. Accordingly, when the piston assembly 212 is moved between the fully extended position and the fully retracted position, the damper tube 204 moves relative to the outer tube 208 before the piston assembly 212 moves within the damper tube 204. That is, as the piston assembly 212 moves from the fully extended position in FIG. 14A to the retracted position of FIG. 14C, and the fully retracted position of FIG. 14D, the damper tube 204 first slides relative to the outer tube 208. The piston assembly 212 then moves relative to the outer tube 208.

When moving from the fully extended position, the damper tube 204 slides within the outer tube 208 until an end 220 of the damper tube 204 contacts the end cap 222 of the outer tube 208. This movement is not significantly damped. Once the damper tube 204 contacts the end cap 222, the piston assembly 212 begins to move relative to the damper tube 204. In this example, the piston assembly 212 moves through oil when moving relative to the damper tube 204. The piston assembly 212 movement through oil is damped more than movement of the damper tube 204 relative to the outer tube 208.

As movement is initiated from the fully retracted position of FIG. 14D, the piston assembly 212 moves the damping tube 204 relative to the outer tube 208 before the piston assembly 212 begins to move through the oil in the damping tube 204. Again, the resistance of the piston assembly 212 moving through the oil and the damper tube 204 is greater than the resistance of the damping tube 204 against the outer tube 208. This facilitates initiating movement of the damping tube 204 relative to the outer tube 208 before the piston assembly 212 begins to move through the oil in the damping tube 204.

The damping tube 204 moves relative to the outer tube 208 until the damping tube 204 contacts the stop 216. At this point, the resistance of the damping tube 204 moving relative to the outer tube 208 is greater than the resistance of the piston assembly 212 moving through the oil in the damping tube 204. The piston assembly 212 moves through the oil in the damper tube 204 after the damper tube 204 contacts the stop 216.

The initial movements of the piston assembly 212 when moving from a fully extended position or a fully retracted position correspond to the damping tube 204 moving relative to the outer tube 208. Accordingly, relatively low efforts are required to initiate movement of the piston assembly 212 from the fully extended position or the fully retracted position. The relatively low efforts facilitate an operator opening or closing a vehicle hood, for example.

In one example, areas 224 and 226 each include a compression spring (not shown). The compression springs position the portion of the piston assembly 212 within the damping tube 204. The spring controls the location at which the piston assembly 212 begins to move through oil in the damping tube 204. In one example, an operator starts to open or close the hood, but then moves the hood in the opposite direction mid-stroke. Positioning the portion of the piston assembly 212 within the damping tube 204 using springs helps damp this movement.

Features of some of the disclosed examples include hydraulic dampening throughout travel of a piston assembly relative to a cylinder, and a hydraulic locking mechanism that works in certain positions of a piston relative to a cylinder. Another feature includes resetting the locking mechanism when the piston assembly is certain positions relative to the tube, such as a fully extended position. Yet another feature includes a locking collar assembly that can accommodate up to one inch of variation in length and a spring within the valve that can mechanically return the pin of the valve assembly to a position that blocks flow between the cavities. A feature of the example incorporating the valve assembly 38a includes providing a lockable piston assembly without requiring a groove or other similar features in the outer tube.

Features of the disclosed examples include controlling bouncing and rate-of-motion of a lift assist mechanism. Another feature includes smoothing operation of the lift assist mechanism in both directions of motion using oil (hydraulic) damping. Yet another feature includes a lift assist mechanism that is lockable in a particular position.

Features of the embodiment disclosed in FIGS. 14 and 15 include damping movement at the end of piston travel without increasing the force to initiate movement to an extended position or initiate movement to a retracted position. Essentially, the example damper mechanism 200 does not significantly increase the force to open and close a component relative to another damped component.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

The invention claimed is:
1. A lockable lift assist assembly, comprising:
a piston assembly moveable between an extended position and a retracted position;
a valve assembly coupled in movement together with the piston assembly, wherein the valve assembly is configured to selectively alter a flow of a hydraulic fluid through a fluid communication path established within the valve assembly to control movement of the piston assembly;

a valve pin of the valve assembly that is moveable to a first position that restricts the flow through the fluid communication path and to a second position that provides a greater flow through the fluid communication path; and an outer tube and an inner tube, the outer tube configured to receive at least a portion of the piston assembly, the inner tube received within the outer tube and configured to hold the hydraulic fluid and the valve assembly, the inner tube establishing a groove that is configured to communicate hydraulic fluid around the valve assembly when the valve pin is in the first position.

2. The lockable lift assist assembly of claim 1, wherein the piston assembly moves between the extended position and the retracted position relative to the outer tube.

3. The lockable lift assist assembly of claim 1, wherein the hydraulic fluid damps movement of the valve assembly to damp movement of the piston assembly.

4. The lockable lift assist assembly of claim 1, wherein the valve assembly limits movement of the piston assembly when the valve pin is in the first position.

5. The lockable lift assist assembly of claim 1, including a spring configured to bias the valve pin toward the first position.

6. The lockable lift assist assembly of claim 1, including a release mechanism assembly configured to initiate movement of the valve pin from the first position to the second position.

7. The lockable lift assist assembly of claim 1, wherein the valve assembly is configured to move axially within the inner tube a first distance, and the groove extends axially along the inner tube a second distance that is less than the first distance.

8. The lockable lift assist assembly of claim 1, including a coil spring to move the piston assembly between the extended position and the retracted position.

9. A method for operating a lockable lift-assist mechanism, comprising:
moving a valve assembly together with a piston assembly between a retracted position to an extended position;
communicating a flow of hydraulic fluid through the valve assembly to damp the moving; and
restricting the flow of hydraulic fluid through the valve assembly to limit the moving; and
bypassing a second flow of hydraulic fluid around the valve assembly during some of the moving to prevent the valve assembly from limiting the moving.

10. The method of claim 9, including actuating a release mechanism to stop the restricting and reinitiate the moving.

11. The method of claim 9, including preventing the restricting during some of the moving to prevent the valve assembly from limiting the moving.

12. The method of claim 9, including biasing the valve assembly toward a position that restricts the flow of hydraulic fluid.

13. The method of claim 9, wherein the restricting comprises preventing the flow of hydraulic fluid through the valve assembly.

14. The method of claim 9, including a spring for moving the valve assembly with the piston assembly between the retracted position and the extended position.

15. The method of claim 14, wherein the spring is a mechanical spring.

* * * * *